United States Patent [19]

Snowball et al.

[11] Patent Number: 4,927,060
[45] Date of Patent: May 22, 1990

[54] APPARATUS WITH STEAM TRAP FOR HEATING AND DISPENSING HOT LIQUIDS

[75] Inventors: Malcolm R. Snowball, St. Leonards-on-Sea; Cecil Hayes, Hastings, both of East Sussex, England

[73] Assignee: W. M. Still & Sons Limited, England

[21] Appl. No.: 187,289

[22] Filed: Apr. 28, 1988

Related U.S. Application Data

[63] Continuation-in-part of Ser. No. 924,512, Oct. 29, 1986, abandoned.

[30] Foreign Application Priority Data

Jan. 8, 1986 [GB] United Kingdom ............... 8600323
Sep. 4, 1986 [GB] United Kingdom ............... 8621316

[51] Int. Cl.$^5$ .................. A47G 19/24; B67D 5/38; B67D 1/08; A47J 31/00
[52] U.S. Cl. .................. 222/146.5; 99/306; 222/132; 222/155; 222/188
[58] Field of Search .................. 222/129, 129.1, 129.2, 222/131, 132, 146.1, 146.2, 146.5, 155–157, 183, 188; 99/280–283, 323.3, 305, 306; 219/282, 310–311, 318, 320, 321, 382, 428, 432

[56] References Cited

U.S. PATENT DOCUMENTS

| 01464,981 | 2/1984 | Stover | 99/305 X |
| 3,084,047 | 4/1963 | Holstein et al. | 99/323.3 |
| 3,149,556 | 9/1964 | Martin | 99/291 |
| 3,556,347 | 1/1971 | Segal | 222/132 |
| 3,691,932 | 9/1972 | Martin | 99/281 |
| 4,455,477 | 6/1984 | Massey et al. | 219/328 |
| 4,638,928 | 1/1987 | Webster | 222/155 |
| 4,771,680 | 9/1988 | Snowball et al. | 99/306 X |

FOREIGN PATENT DOCUMENTS 1403861 8/1973 United Kingdom .

Primary Examiner—Robert J. Oberleitner
Attorney, Agent, or Firm—Wood, Phillips, Mason, Recktenwald & VanSanten

[57] ABSTRACT

This invention relates to apparatus for heating, brewing, storing and dispensing a hot liquid. Known brewing apparatus typically dispenses hot water and a single beverage. Where a selection of beverages are desired a plurality of such apparatus is required. This brewing apparatus in accordance with the invention has within a single housing a hot water unit and a plurality of beverage brewing units to dispense different hot beverages. Further, each of the brewing units consists of a heating and brewing portion and a liquid storing and dispensing portion, the liquid storing and dispensing portion being detachable from the apparatus to dispense beverage at a location distant from the apparatus. The detachable liquid storing and dispensing unit comprises an insulated container with a liquid dispensing tap having a valve positioned well within the insulated wall of the container and a steam trap at the inlet to the container to prevent heat losses from the container. Thus hot beverage can be maintained at suitable drinking temperature for a substantial period without any additional power consumption.

13 Claims, 11 Drawing Sheets

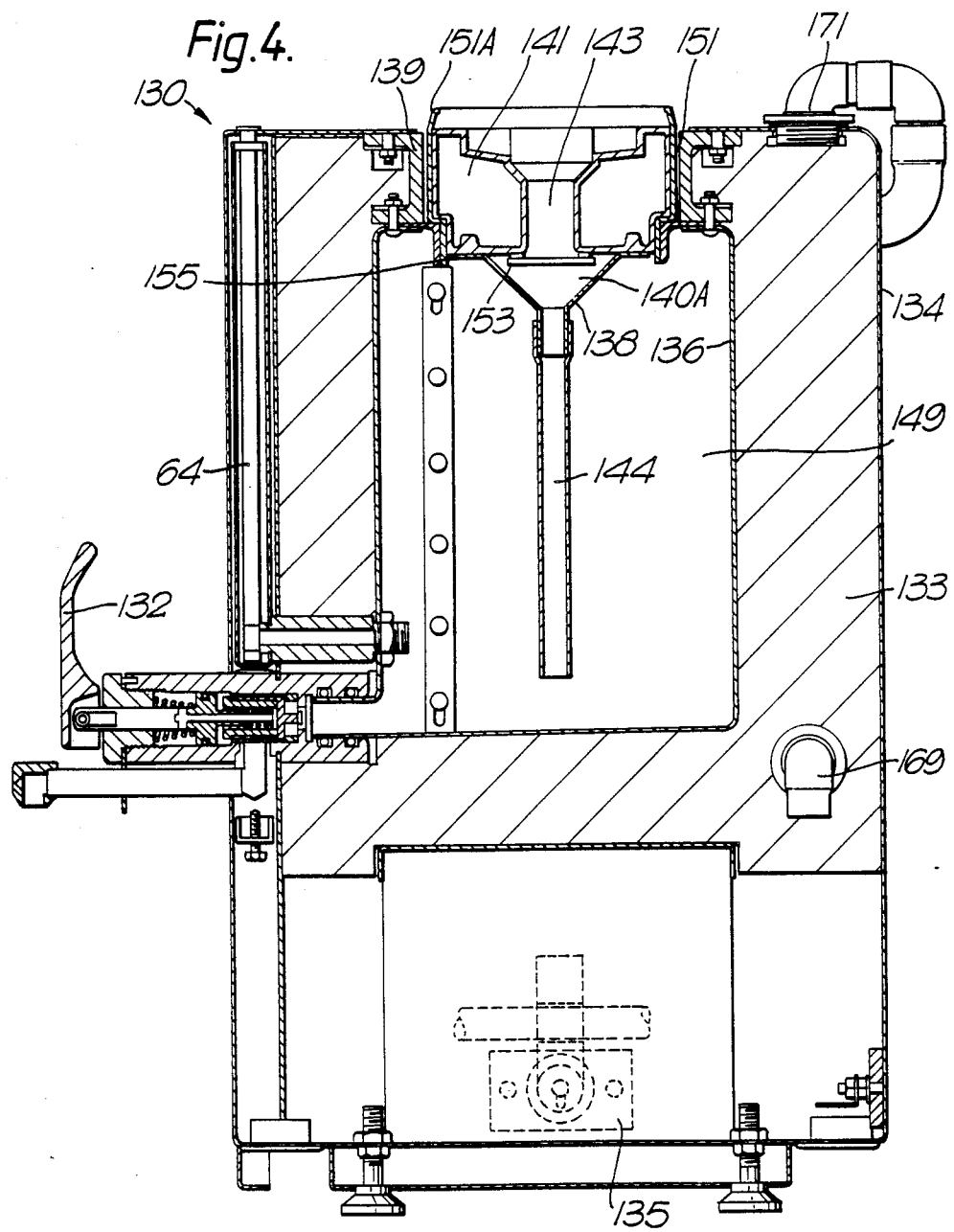

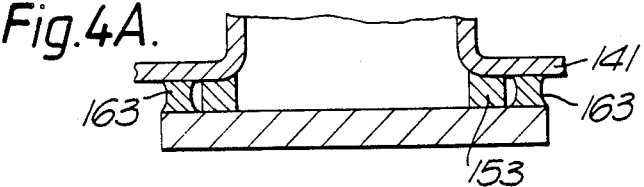
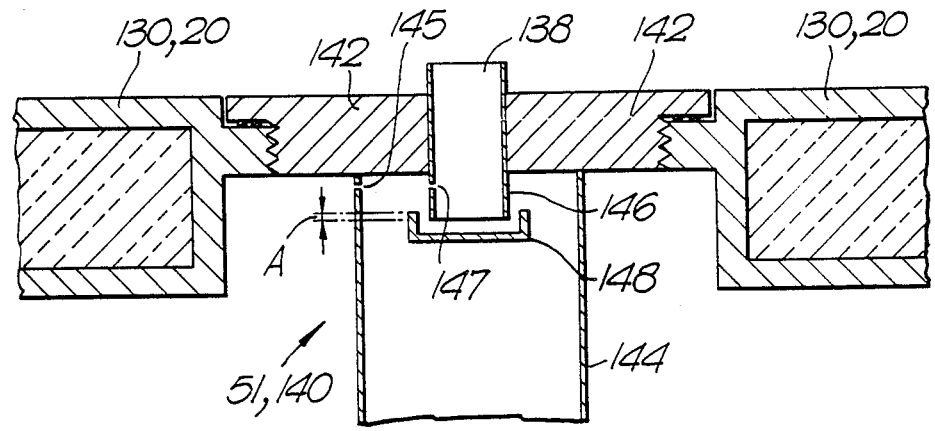
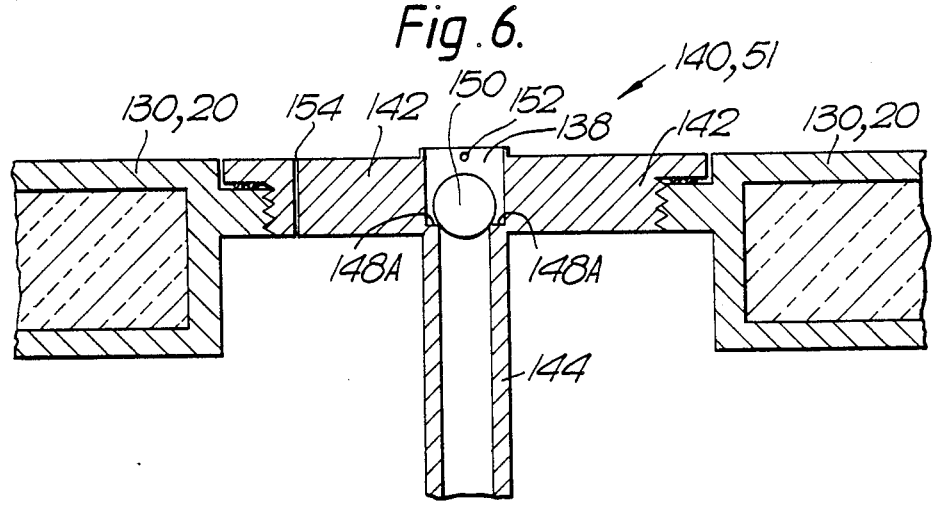

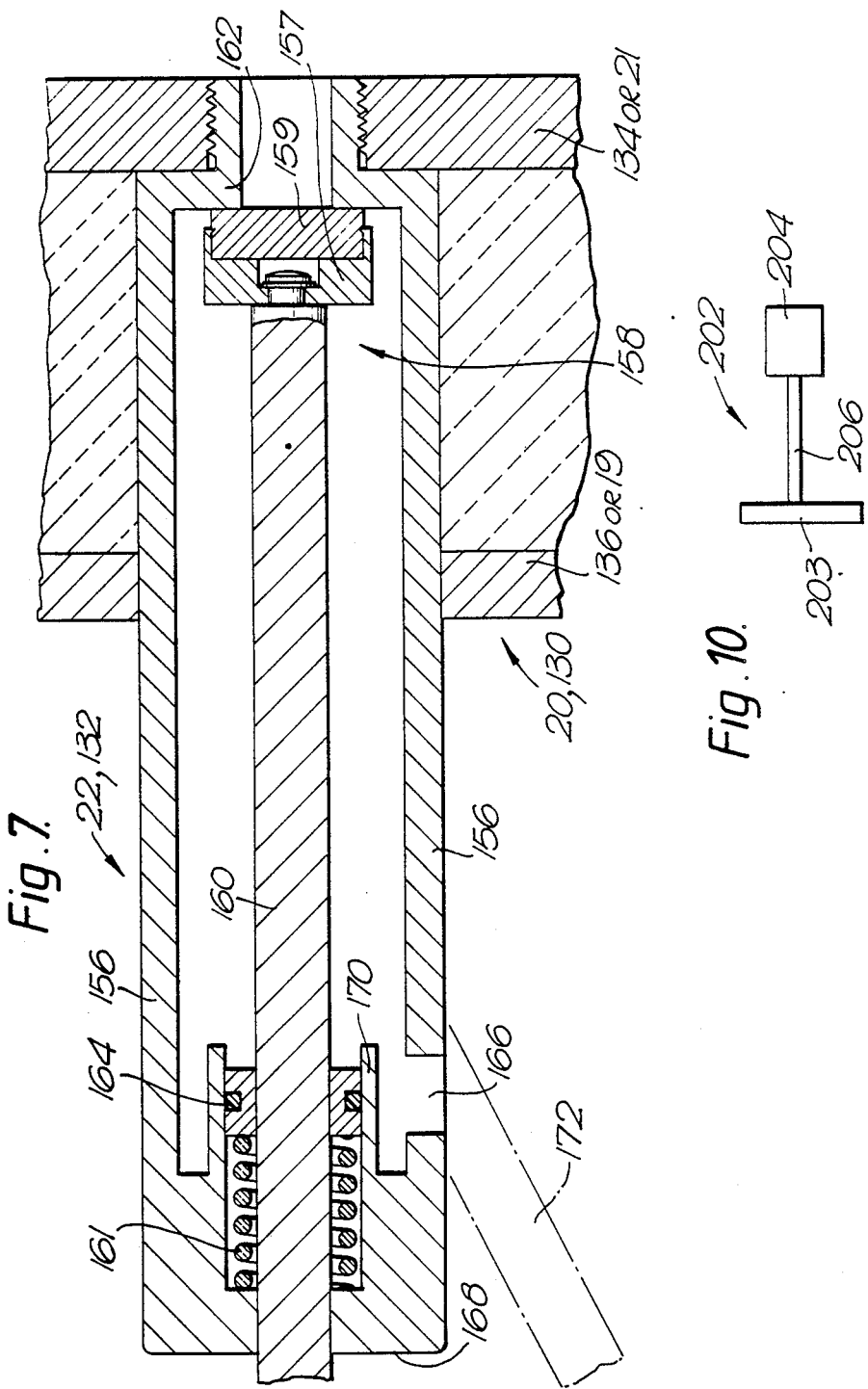

APPARATUS WITH STEAM TRAP FOR HEATING AND DISPENSING HOT LIQUIDS

This is a continuation-in-part of my co-pending application Ser. No. 924,512 filed Oct. 29, 1986 entitled 'Apparatus for Heating and Dispensing Hot Liquids', now abandoned.

Apparatus is known which heats, brews, stores and dispenses a hot beverage. If a selection of hot beverage is desired then separate apparatus is required for each one. This is inconvenient because it is costly and takes up valuable space. Further, with such apparatus it is usual for the prepared hot liquid to be dispensed from a storage tank or container, in which it needs to be kept hot over a substantial period of time. This is usually achieved by either providing storage tanks with individual heating elements or standing beverage containers on heated plates. These arrangements are disadvantageous in that the liquid tends to overheat and burn so that flavour is lost. Also the liquid may only be dispensed from the tank or container when in situ with or close to the rest of the apparatus unless the container is provided with means for connection to a separate electricity supply.

An apparatus for heating and dispensing a plurality of hot liquids in accordance with the invention comprises a housing incorporating a plurality of independent liquid heating and dispensing unit including a hot water unit and at least one beverage brewing unit. The beverage heating unit comprises a liquid heating portion, a brewing portion and a liquid storing and dispensing unit. The liquid storing dispensing unit is detachable from the housing so that beverage can be dispensed at a location distant from the heating and brewing apparatus.

The apparatus preferably has a single hot water unit and a plurality of beverage brewing units. Each of the units is provided with a separate inlet for connection to a public water supply so that each of the units may, if desired be operated independently.

The detachable liquid storing and dispensing units comprise a container having walls of an insulating material, a dispensing tap projecting through the insulated walls, and a hot liquid inlet. The valve of the dispensing tap is positioned within the insulated wall of the container and the tap housing is a plastic material so that heat losses from the container through the tap are minimised. The inlet to the container is positioned directly beneath the outlet of the brewing portion of the independent units when the storage and dispensing units are in situ with the rest of the apparatus. This inlet is provided with a steam trap to further prevent heat losses from the container when the dispensing units are removed from the apparatus.

Thus the apparatus in accordance with the invention provides a bulk brewer capable of brewing and dispensing a plurality of hot beverage and insulated independent storing and dispensing units which have a number of features to prevent heat loss. The temperature drop of beverage within the container is less than 5° C./hr, preferably less than 1° C./hr, and, therefore, the beverage is maintained at a temperature suitable for drinking over a substantial period of time without any additional power consumption or spoilage of the beverage due to overheating.

The invention will now be described by way of example with reference to the accompanying drawings in which:

FIG. 4 is an enlarged side view of one embodiment of the independent liquid storing and dispensing unit of FIG. 3.

FIG. 4a is an enlarged sectional view of the first embodiment of the steam trap in operation.

FIG. 5 is an enlarged view of the second embodiment of a steam trap for use with the units shown in FIGS. 2, 3 and 4.

FIG. 6 is an enlarged view of a third embodiment of a steam trap for use with the units shown in FIGS. 2, 3 and 4.

FIG. 7 is an enlarged side view of the tap arrangements for use with the independent storing and dispensing units.

FIG. 10 is a schematic side view of a scale warning device used in the apparatus of FIG. 1.

Figure 1:
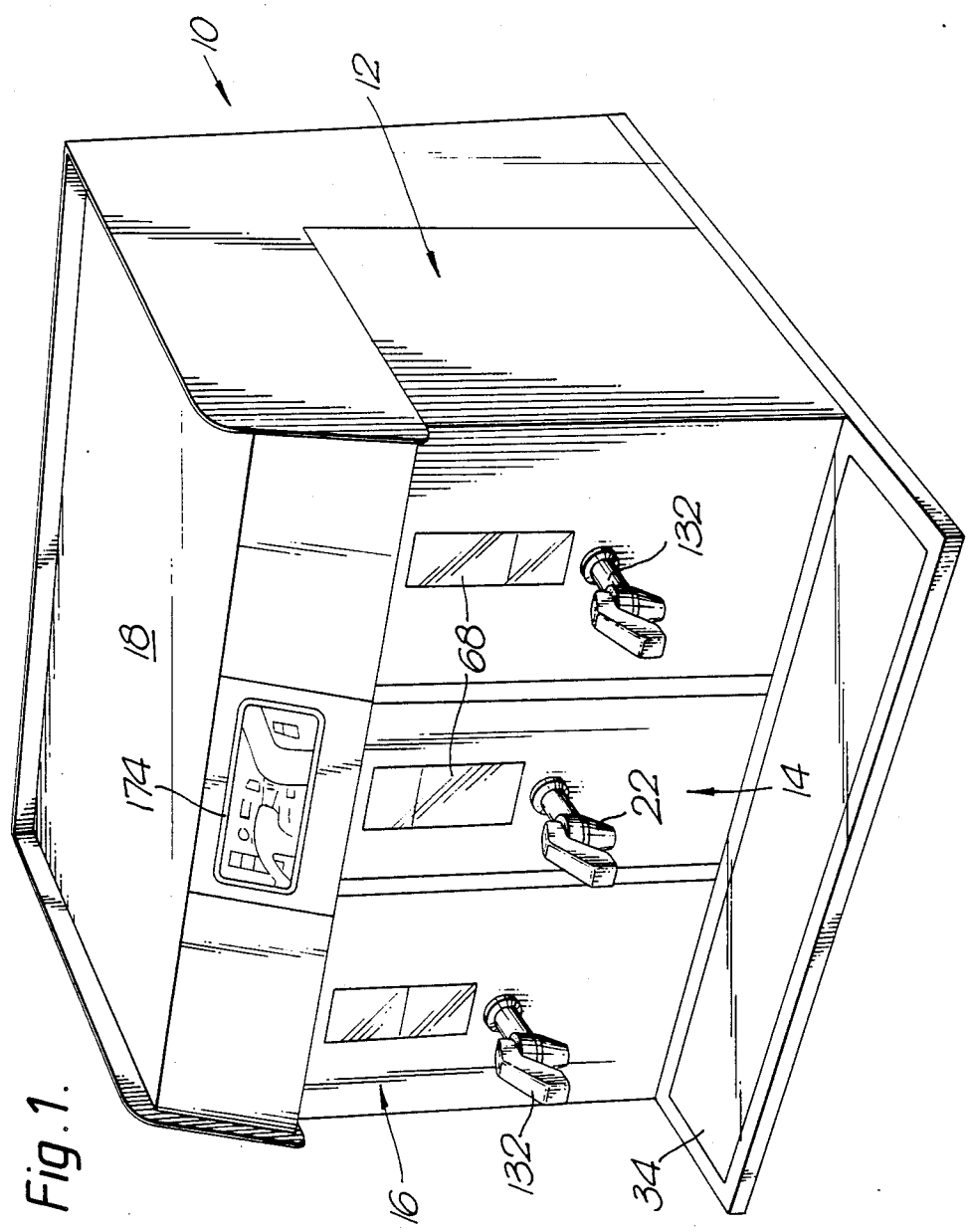
FIG. 1 shows a perspective view of the apparatus.

In FIG. 1, a bulk brewer apparatus 10 is shown including a right hand unit 12, a central unit 14 and a left hand unit 16, all within a common housing 18.

Figure 2:
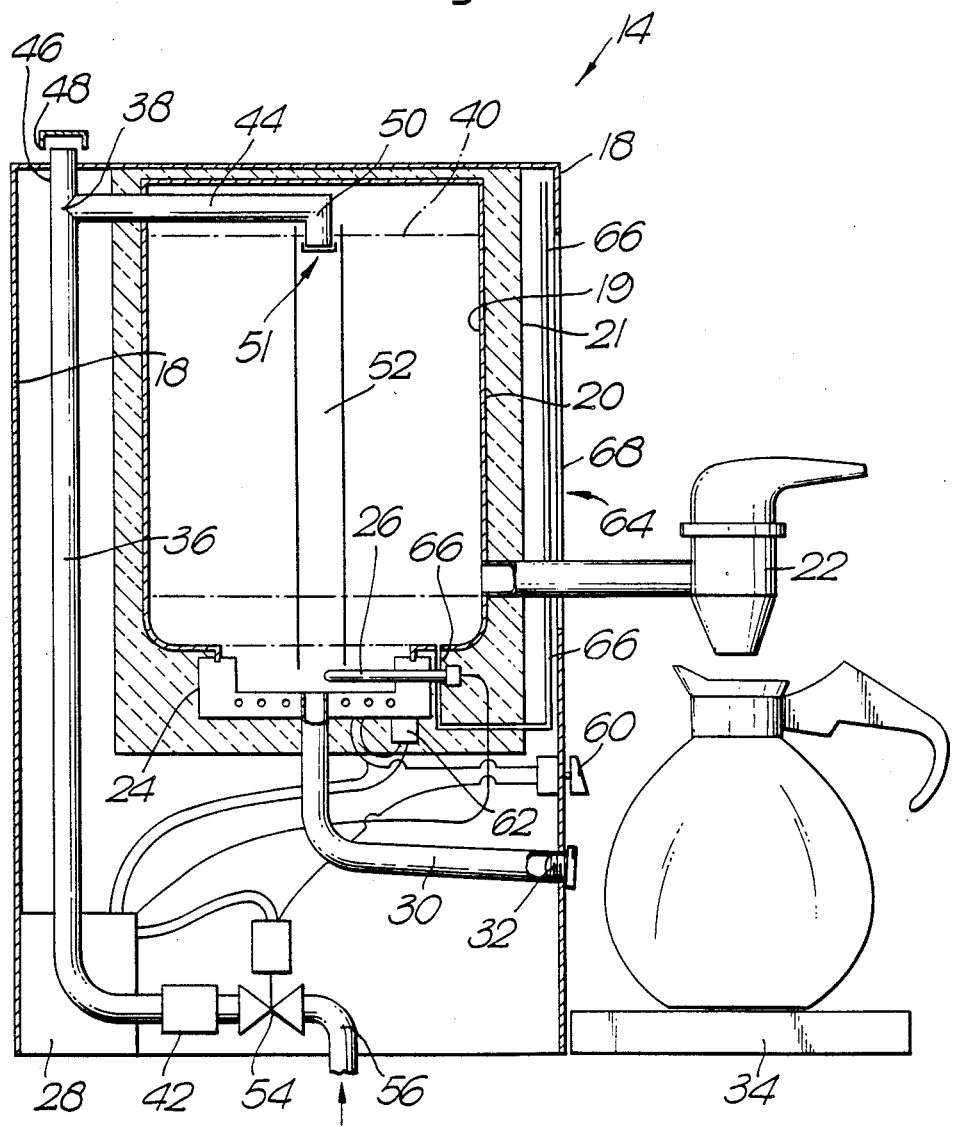
FIG. 2 is a schematic side view of the hot water storing and dispensing unit in accordance with the invention.

In FIG. 2, the central unit 14, in the form of a hot water dispenser, is shown in greater detail, having a tank 20 forming a hot water container and a draw-off tap 22 located towards the bottom of the tank 20.

The tank 20 has an insulated wall structure consisting of an inner wall 19 and an outer wall 21, between which walls 19 and 21 a layer of insulating foam material is provided (for example the isocyanate foam material plastics foam such as expanded plastics foam isocyanurate plastics foam and the rigid urethane foam system marketed as PP.502 by Honeywell-Atlas Ltd. as disclosed in GB Patent No. 1403861).

A cast-in element heater 24 forms the base of tank 20, and mounted just above the base and supported by the heater casting is a thermostat phial 26 connected to a controller 28. A conduit 30 extends through the heater 24 to a drain plug 32 above a drip tray 34.

Cold water is supplied to the tank 20 via a conduit 36 which extends upwardly to a 'T' junction 38 just above an upper water level 40. The conduit 36 terminates at its upper end at the 1 T' junction 38 and at its lower end at a water flow regulator 42. Regulator 42 is a known commercially available item for inhibiting pressure surges. Conduit 36 forms a small cold water container of small bu nevertheless significant volume.

From the 'T' junction 38, another conduit 44 extends into the tank 20, the outlet 50 of the conduit 44 being located above a downwardly extending tube 52 positioned in the centre of the tank 20. The arrangement is such that an air brake is formed at the top of the tube 52, and cold water is fed down through the tube 52 to a position near the theromstat 26.

The upper portion of the tube 52 is provided with steam trap means 51 which is U-shaped in cross section just below the outlet 50 of the conduit 44. Three embodiments of steam trap means 51 are shown in greater detail in FIGS. 4 and 5, and 6 and are described in detail below.

A final conduit 46 of the 't' junction 38 extends upwardly to a vent 48 to atmosphere to prevent any siphoning back.

Connected to regulator 42 is a solenoid operated valve 54 controlled by controller 28 so as to open to shut the supply of mains cold water from supply conduit 56.

A thermostat temperature control 60 for the heater 24 is provided movable between any setting between 50° C. and 95° C. A thermal safety cut-out 62 is also provided on the bottom of heater 24.

Level indicating means 64 are also provided for the unit 14 comprising a pipe 66 extending from the base of the tank 20 and then up and along the side thereof. A window 68 is provided in the housing 18 whereby the water level in the pipe 66 (which will correspond to the actual water level in the tank 20) can be ascertained by a user. The cross-sectional area of the tube 66 relative the cross-sectional area of tank 20 is extremely small, in order to minimize heat loss. The pipe 66 extends from the base of the tank 20 also to minimize heat loss, since heat in the tank 20 will not travel downward.

The other two units 12 and 16 (see FIGS. 3 and 4) which are in the form of coffee and/or tea making units, each comprise a heater 102, spray head 104 and coffee infuse basket 106, all supported by the housing 18 of the apparatus 10.

Cold water is supplied to an inlet 108 of the heater 102 by means of a flexible pipe or conduit 110. Heater water then flows from the heater, 102 through an outlet 112 to a flexible pipe or conduit 114 which passes up to the spray head 104 positioned above the coffee infuser basket 106.

At the back of the heater 102 is an electrical heating element 116 with electrical leads 118 extending from the top of the heater and connected to further electrical elements (not shown). The heater 102 is 'side hung' mounted to its particular support via a hinge (not shown) in order to allow access when necessary to other parts of the unit 12 or 16. The heater 102 is covered with a circular cover plate 120 in which the inlet 108 and outlet 112 are mounted. The cover 120 is secured to the heater by means of a wing nut 122 which screws into a central boss 124 on the heater.

The heater 102 is provided with a drain cock 126 which screws into a hole 128 in the bottom of the heater and which is opened when necessary to drain the heater of any water.

The units 12 and 16 also include a removable storing and dispensing container portion 130 having a draw-off tap 132. The container 130 has an outer wall 134 and an inner wall 136 between which a layer of insulating foam material is provided (for example material as described earlier herein and disclosed in GB Patent No. 1403861. The inlet 138 of the container (when positioned within the housing 18) is situated below the outlet of the basket 106, and is provided with steam trap means 140.

The container 130 is consequently independently insulated such that there is only a 1° to 1.5° C. drop every hour, and can be detachable from the rest of the main apparatus 10 to dispense coffee/tea through tap 132 at a location distant from the rest of the apparatus.

One embodiment of the detachable storage and dispensing apparatus is shown in FIG. 4.

The unit 130 is provided with walls 133 of insulative material, preferably being about 40 mm thick. The unit is further provided on the lower side wall with a contact pad 135 so that when positioned within the housing 18, it is connected to the electrical circuitry of the apparatus 10.

The inlet 138 of the detachable unit 130 has a silicon collar 139 within which a hollow bung 141 is seated. The bung has a central bore 143 which, when the unit is positioned within the housing 18, is directly below the outlet of the basket 106. Thus, when the brewing units 12 and 16 are in operation the unfused beverage discharges from the basket 106 into the inlet 138 of the unit 130 and thence through the downwardly extending mix pipe 144 into storage chamber 149. The bung 141 is surrounded by a skirt 151 which is shaped to sealingly engage the sides of the bung. The skirt 151 has a portion 151A which protrudes above the top surface of the bung and is arranged to engage the outlet of the basket 106 when the unit 130 is in situ with the apparatus 10.

To further prevent heat loss from the chamber 149, steam trap means 140A are provided at the inlet 138. In the embodiment shown in FIG. 4 the stem trap comprises a circular plate 153 mounted on the bottom of the bung 141 by means of pins 155. The plate is so positioned as to be directly below the central bore 143 and to be spaced approximately 1 mm from the bottom surface of the bung 141. The pins 155 are spaced slightly inwardly from the edge of the plate.

The operation of the steam trap is seen in FIG. 4A. As liquid enters the container 149 from the bore 143 it must impinge upon the plate 153 since its top surface area is greater than that of the bore 143. Thus, when the last drops of liquid impinge on the plate 153 surface tension causes them to form an annular bead 163 between the top surface of the plate and the bottoms surface of the bung 141. The liquid thus forms an annular ring between the plate and the bung which provides an effective seal against loss steam.

Should the bead become dislodged during movement of the unit extra steam or natural condensation replaces it.

Two further embodiments of steam trap means 51 and 140 are shown in greater detail in FIGS. 5 and 6. In FIG. 5, the tank 20 or unit 130 has a screw on lid 142 to which the downwardly extending mixing tube 144 is connected to feed hot water, or beverage down to the base of the tank 20 or container 130 (see FIGS. 2, 3 and 4). At the centre of the lid 142, the inlet 138 is formed by a pipe 146 which extends into the centre of the tube 144. A U-shaped trap member 148 is supported just below the outlet of the pipe 146, such that the sides of the trap member 148 extend slightly above the lower edges of pipe 146 (see distance marked A in FIG. 5). This arrangement acts as a steam trap because hot beverage, or water passing through pipe 146 and into tube 144 will form a layer of liquid in the U-shaped trap member 148 preventing steam from inside the tank 20 or container 149 passing out through inlet 138. In order to prevent any build up in pressure inside the tank 20 or container 149, very small vent holes 145 and 147 are provided in tube 144 and pipe 146 respectively.

In FIGS. 6, the tank 20 or unit 130 is shown also having a screw-on lid 142 integral with a downwardly extending tube 144 which feeds hot water or beverage to the base of the tank 20 or unit 130. At the centre of the lid 142, the inlet 138 is formed by a hole in the lid, and the top of the tube 144 has a ledge 148A on which a trap ball 150 is supported. When no hot water or beverage is passing through inlet 138, the trap ball 150 sealingly engages the ledge 148A and acts to prevent steam from inside the tank 20 or container 149 passing out through inlet 138. On the other hand, when hot water or beverage is passing through inlet 138 the trap ball 150 'floats' off the ledge 148A to allow liquid to pass through into tube 144, the ball 150 being retained in the inlet 138 by a pin 152. The lid 142 is also provided with a very small vent hole 154 in order to prevent any build up in pressure inside the tank 20 or container 130.

The unit 130 has level indicating means 64 very similar to those described above and shown in FIG. 2.

The unit shown in FIG. 4 is further provided with an air vent or conduit 171 which has an inlet at the top of the chamber 149 and which extends downwardly through the insulated wall to an outlet 169 near the bottom of the unit. Air displaced from the container 149, on filling with hot beverage or water remains warm on the passage through the conduit to the outlet due to the insulated wall. This arrangement helps prevent further heat losses from the unit.

Figure 3:
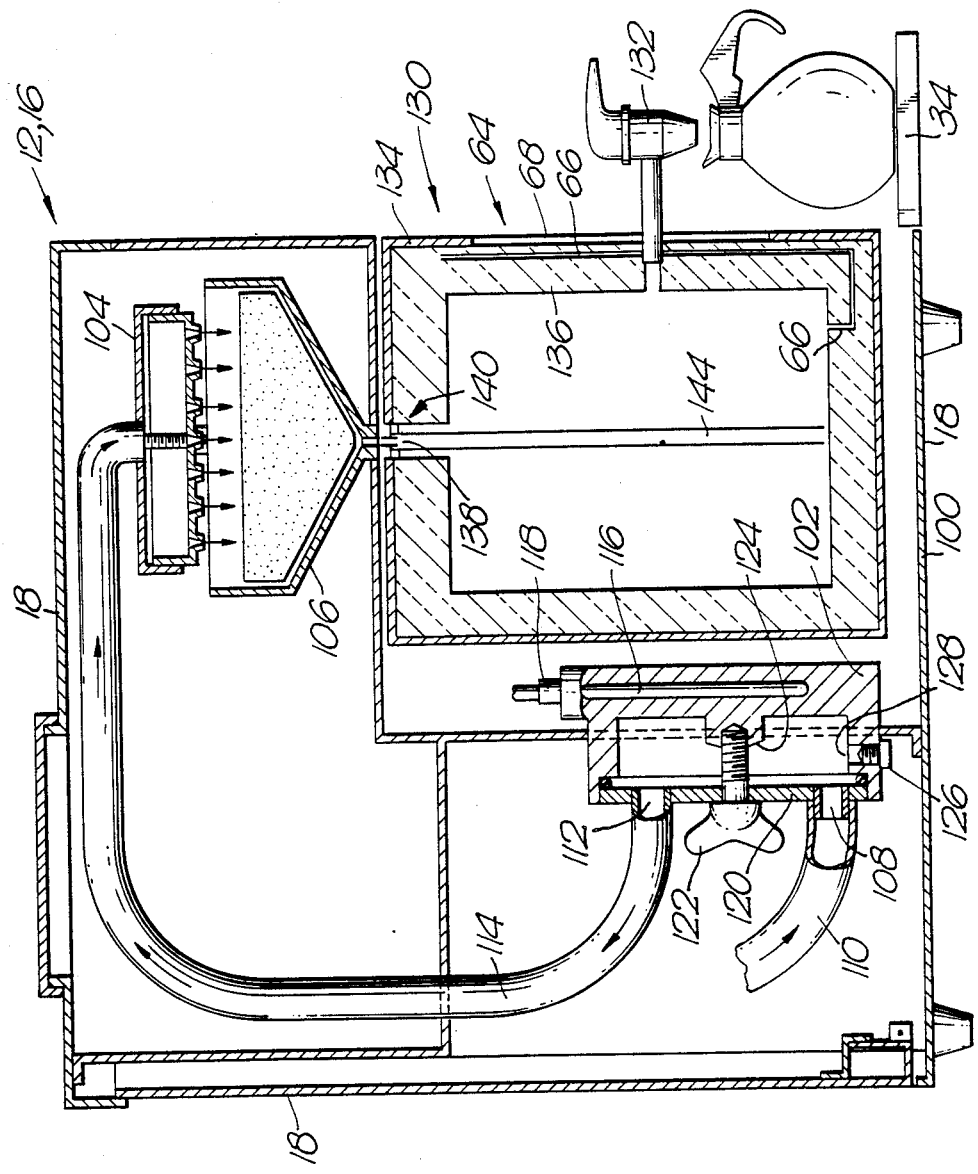
FIG. 3 is a schematic side view of the coffee/tea making units of the apparatus shown in FIG. 1 and liquid a storing and dispensing units in accordance with the invention.

In FIG. 3 the arrangement is shown set up for brewing coffee. However, tea may be brewed by amending the coffee infuser basket 106 as taught by the applicants U.S. patent application Ser. No. 081,188, now issued as U.S. Pat. No. 4,771,680, (the contents of which are incorporated herein by reference).

Indeed the unit 130 may be filled with hot liquid completely independently of the apparatus 10.

In FIG. 7 the taps 22 and 132 shown in FIGS. 1 to 3 are shown in greater detail, having a housing portion 156 of plastics material and a valve 158. The valve 158 comprises a brass longitudinal stem 160 with a brass valve mounting member 157 for a silicon rubber valve element 159. A handle (not shown) is provided on the stem 160, at the other end from the valve element 159. The valve element 159 is biased by a spring 161 against a valve seat 162 which forms part of the tap housing portion 156 near the inner wall 19 or 134 of the unit 12, 14 or 16. An O-ring seal 164 is also provided to seal the spring 161 from liquid passing through the tap.

The outlet 166 of the tap is positioned as far as possible from the outer wall 21 or 136 of the unit 12, 14 or 16 for the purposes of easy access. The outlet 166 is also positioned as close as possible to the outer wall 168 of the tap, and in this respect a ledge 170 to support the stem 160 is provided extending inwardly and past the outlet 166. Optionally, a dispensing tube 172 may also be provided from the outlet 166. To draw beverage or water out of the tap, the handle (not shown) is operated to move the stem 160 outwards and thus lift the valve element 159 off the valve seat 162. Liquid from the container 130 thus flows past the valve element 159 through the housing 156 and finally out of the outlet 166.

The provision firstly of the valve seat 162 well within the insulated wall 19 or 136 of the unit, and secondly of a plastic housing 156 for the tap, causes minimal heat loss from the liquid in the unit through the tape.

Figure 8:
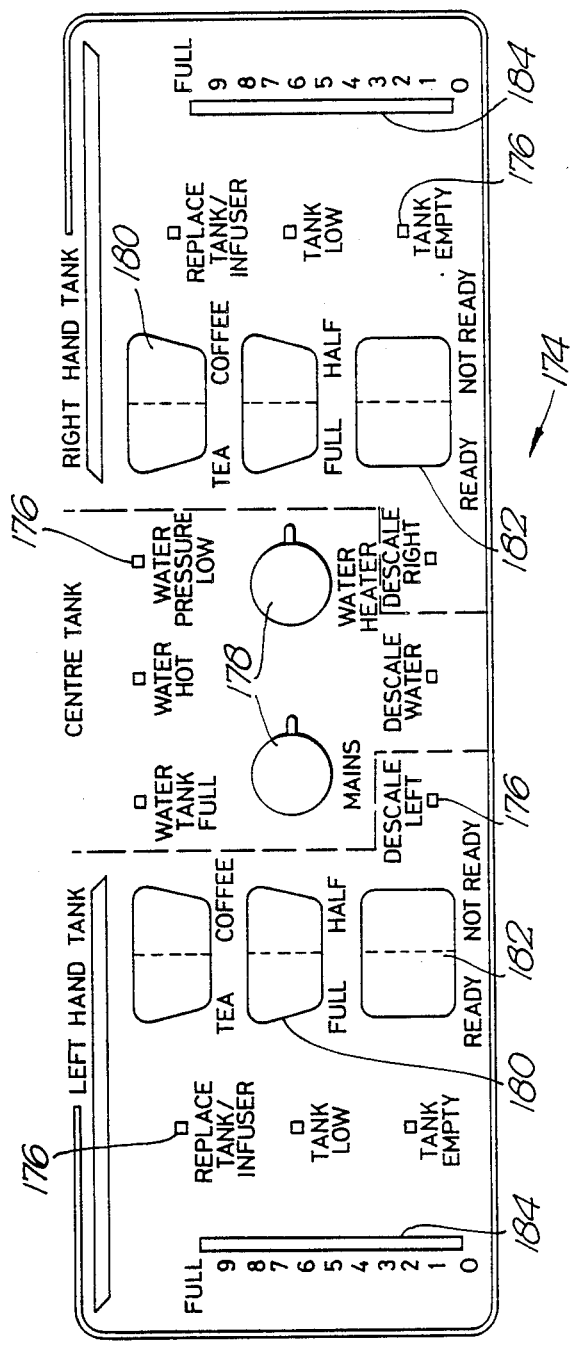
FIG. 8 is an enlarged side view of the indicator panel shown in FIG. 1.

In FIG. 8, the indicator panel 174 seen in FIG. 1 is shown in greater detail. The panel 174 for the three units 12, 14 and 16 comprises a number of warning lights 176, on-off switches 178, 'option' switches 180 indicator switches 182, and liquid level scales 184.

Figure 9:
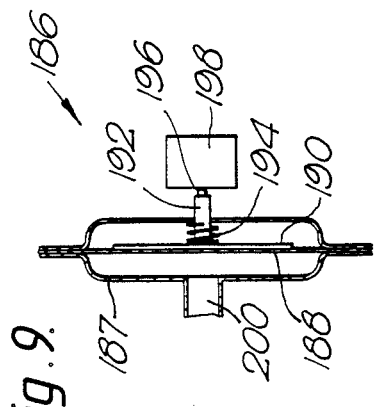
FIG. 9 is a schematic side view of a pressure warning device used in the apparatus of FIG. 1.

In FIG. 9, a pressure device 186 is shown having a housing 187 incorporating a silicon rubber diaphragm 188 and a disc or table 190 connected to a spigot 192. A spring 194 around the spigot 192 is provided to bias the disc 190 against the diaphragm 188, while the other end 196 of the spigot 192 is in contact with a microswitch 198. In use, water for the apparatus 10 is passed through the inlet 200 of the housing 187, and acts against the diaphragm 188 to move the disc 190 and spigot 192 towards the microswitch 198. Should the water have a dangerously high or low pressure, then the microswitch 198, which is pre-calibrated, will be activated to give an appropriate warning.

In FIG. 10, a scale warning device 202 is shown in conjunction with a heating element 203, the device comprising a thermister 204 engaging a contact member 205. In use, when scale has built up to an unacceptable level, the heating element 203 will heat up to temperature higher than its usual operating temperature and the thermister senses this and compares it electronically with a preset level, whereafter an appropriate warning will be given.

Figure 11:
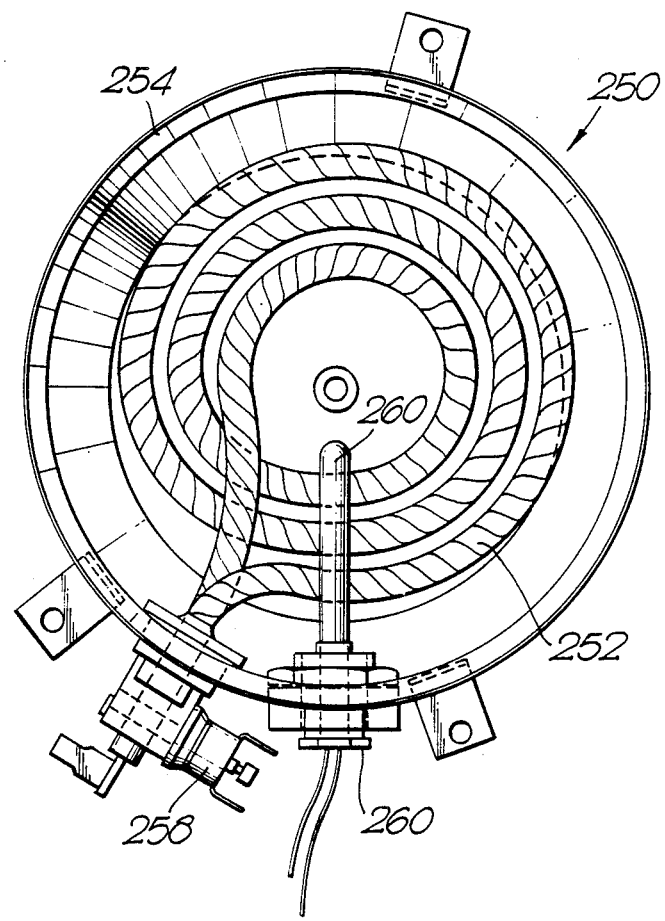
FIG. 11 is a plan view of an alternative heater arrangement for use in the dispenser unit of FIG. 2.
Figure 12:
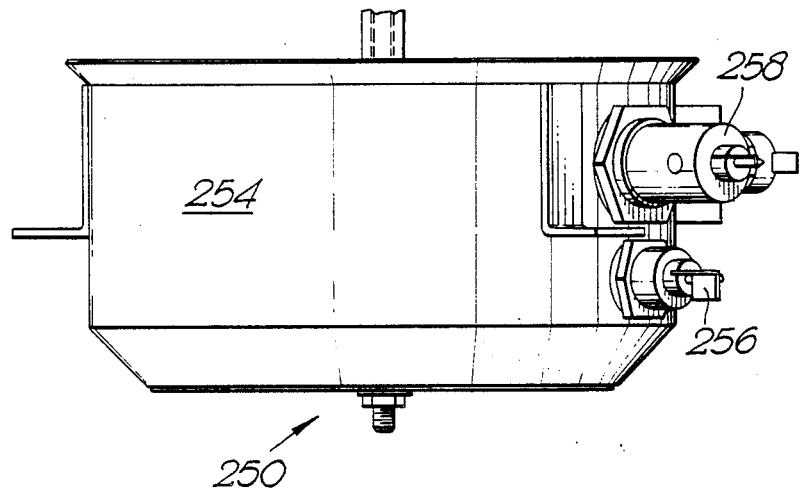
FIG. 12 shows a side view of the heater of FIG. 11.
Figure 13:
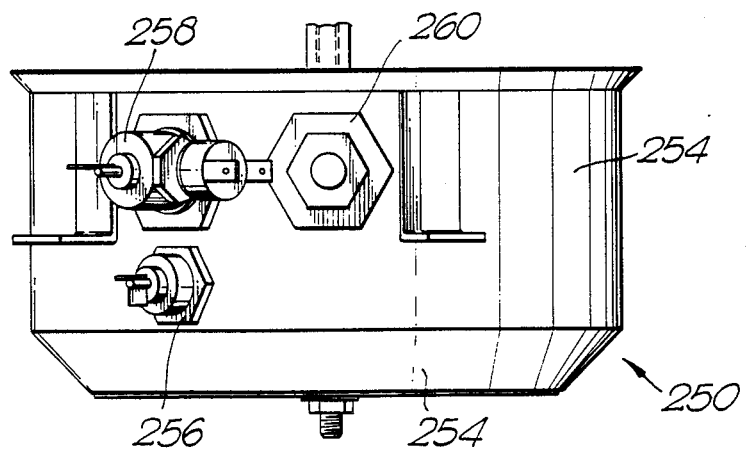
FIG. 13 shows a front view of the heater of FIG. 11.

Instead of the cast-in element heater 24 of the central unit 14 shown in FIG. 2, a heater arrangement 250 as shown in FIGS. 10 to 12 having a heating element 252 can be used.

In particular, the heater arrangement 250 has a housing 254 which forms the base of the tank 20, and which housing supports the heating element 252 which is spiralled to form three coils (as described in GB Patent Application No. 8621318 the contents of which are incorporated herein by reference). The element 252 is made from a material having a relatively high coefficient of expansion, such as copper with an electro-tin finish or stainless steel whereby the coils expand in all directions when current is supplied via the electrical connections 256 and 258. When current is no longer passed through the coils, the coils contract, and this continual expansion and contraction tends to "crack off" scale from the curved surfaces of the element 252.

A sensor 260 is supported by the housing 254 slightly above the element 252 in order to stop supply of current via the connections 256 and 258 when the element 252 is not fully covered by water or other liquid to be heated.

Figure 14:
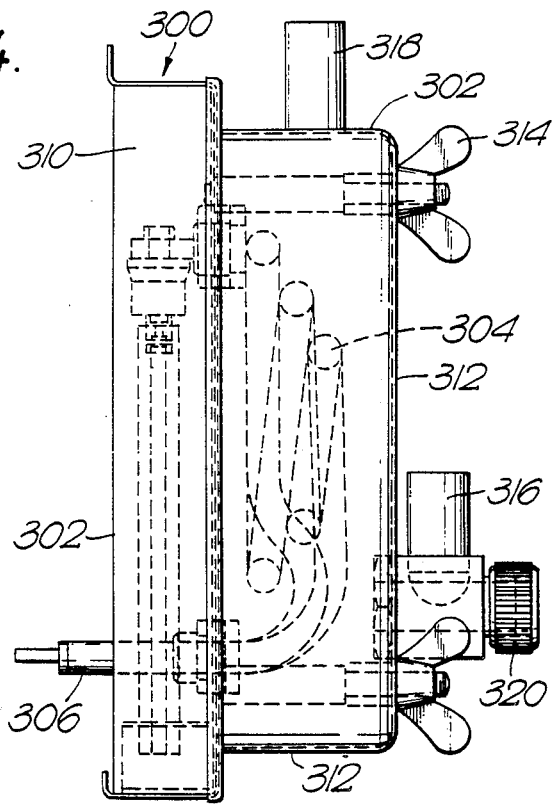
FIG. 14 shows a side view of an alternative heater arrangement for use in the coffee/tea making unit of FIG. 3.
Figure 15:
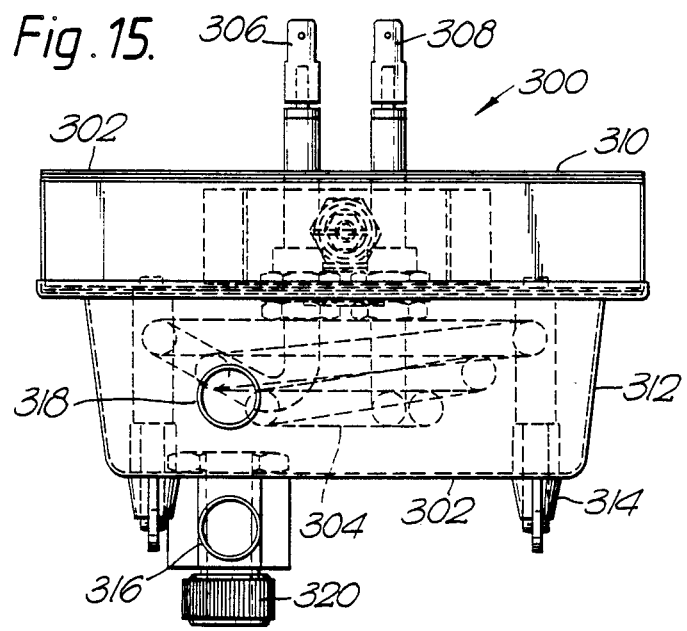
FIG. 15 shows a plan view of the heater of FIG. 14.
Figure 16:
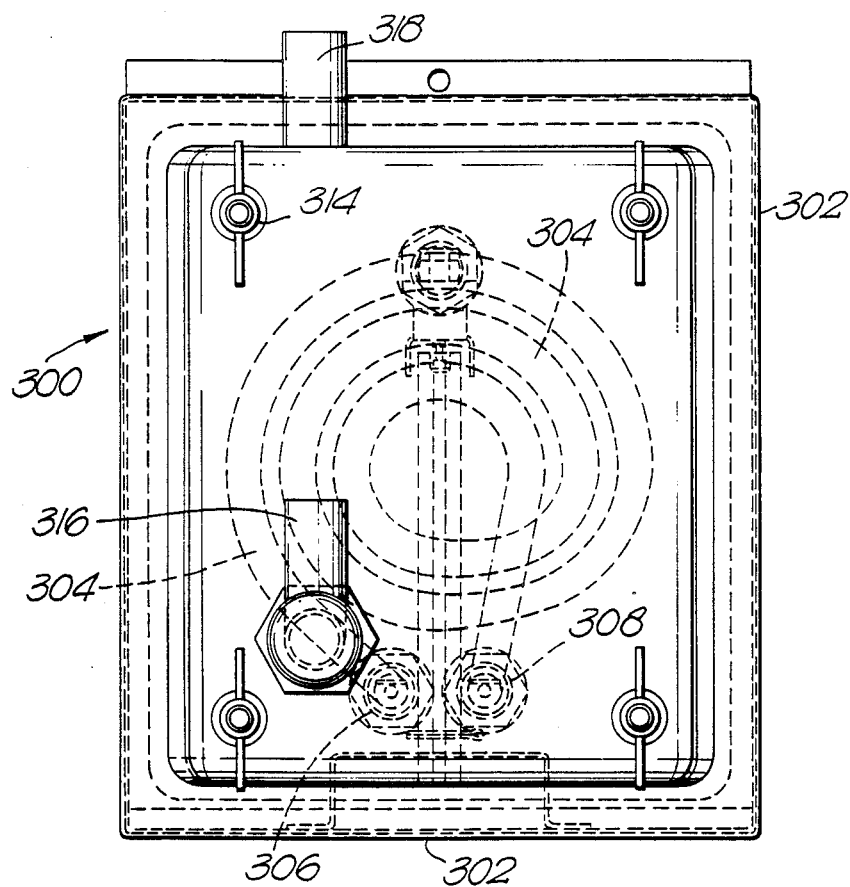
FIG. 16 shows a front view of the heater of FIG. 14.

As an alternative to the heater 102 of the units 12 and 16 shown in FIG. 3, the heater 300 shown in FIGS. 14 to 16 may be used.

In particular, the heater arrangement 300 is supported behind the removable container 130, the heater arrangement 300 having a housing 302 supporting a heating element 304 which is spiralled to form three coils (as described in GB Patent Application No. 8621318). The element 304 is made from a material having a relatively high coefficient of expansion, whereby the coils expand in all directions when current is supplied via the electrical connections 306 and 308. When current is no longer passed through the coils, the coils contract, and this continual expansion and contraction tends to "crack off" scale from the curved surfaces of the element 304.

The housing 302 comprises a rear housing portion 310 and a front housing portion 312, the front housing portion 312 being secured to the rear housing portion 310 by four wing nuts 314. The front housing portion 310 is provided with a cold water inlet 316 and a hot water outlet 318. The cold water inlet 316 has an adjustable water flow controller 320 in order to control the rate of flow of cold water into the heater arrangement 300.

The apparatus 10 shown in FIG. 1, which is capable of making and dispensing a large volume of liquid, is between 80 and 140 cm in length, between 60 and 70 cm in depth, and between 40 and 70 cm in width (not including tray 34).

In conclusion, the apparatus 10 includes three separate units 12, 14 and 16, wherein each unit has its separate heating, storing and dispensing mechanisms and where at least one of the storing and dispensing units is detachable. This leads to an arrangement having low energy consumption and provides compact apparatus which can dispense a plurality of liquids.

What we claim is:

1. A hot liquid storing and dispensing unit comprising:
    a closed hot water tank having a wall;
    a housing containing the hot water tank;
    an insulating jacket within the housing and surrounding the hot water tank;
    an outlet dispensing tap;
    means passing through the insulating jacket for connecting the dispensing tap to the hot water tank;
    means outside the housing for actuating the dispensing tap;
    a dispensing valve within the jacket coupled to the actuating means adjacent to the tank wall;
    a hot liquid inlet conduit connected to a water supply and having a passage extending through the tank wall and opening vertically downwards into the hot water tank above a supply of water in the hot water tank; and
    a steam trap associated with the hot liquid inlet conduit,
    said steam trap including means for normally closing the inlet passage to prevent escape of steam from the hot water tank through the inlet passage and for opening the inlet passage in response to a predetermined head of water in the inlet passage to allow water from said supply to enter the tank,
    wherein the steam trap comprises a trap member which is U-shaped in cross-section and which is supported just below the outlet of the hot liquid inlet conduit.

2. A hot liquid storing and dispensing unit as claimed in claim 1 wherein the top of the sides of the trap member are positioned above the bottom of the inlet conduit.

3. A hot liquid storing and dispensing unit comprising:
    a closed hot water tank having a wall;
    a housing containing the hot water tank;
    an insulating jacket within the housing and surrounding the hot water tank;
    an outlet dispensing tap;
    means passing through the insulating jacket for connecting the dispensing tap to the hot water tank;
    means outside the housing for actuating the dispensing tap;
    a dispensing valve within the jacket coupled to the actuating means adjacent to the tank wall;
    a hot liquid inlet conduit connected to a water supply and having a passage extending through the tank wall and opening vertically downwards into the to water tank above a supply of water in the hot water tank; and
    a steam trap associated with the hot liquid inlet conduit,
    said steam trap including means for normally closing the inlet passage to prevent escape of steam from the hot water tank through the inlet passage and for opening the inlet passage in response to a predetermined head of water in the inlet passage to allow water from said supply to enter the tank,
    wherein the steam trap comprises a downwardly depending inlet pipe on said hot water tank, integral with a lid fitted to the unit and a trap ball which sealingly engages a mouth of the pipe and is so dimensioned as to prevent the passage of steam therethrough.

4. A hot liquid storing and dispensing unit as claimed in claim 3 wherein the trap ball is adapted to float away from the mouth of the pipe when the liquid enters the unit through the inlet pipe.

5. A hot liquid storing and dispensing unit comprising:
    a closed hot water tank having a wall;
    a housing containing the hot water tank;
    an insulating jacket within the housing and surrounding the hot water tank;
    an outlet dispensing tap;
    means passing through the insulating jacket for connecting the dispensing tap to the hot water tank;
    means outside the housing for actuating the dispensing tap;
    a dispensing valve within the jacket coupled to the actuating means adjacent to the tank wall;
    a hot liquid inlet conduit connected to a water supply and having a passage extending through the tank wall and opening vertically downwards into the hot water tank above a supply of water in the hot water tank; and
    a steam trap associated with the hot liquid inlet conduit,
    said steam trap including means for normally closing the inlet passage to prevent escape of steam from the hot water tank through the inlet passage and for opening the inlet passage in response to a predetermined head of water in the inlet passage to allow water from said supply to enter the tank,
    wherein the steam trap comprises a circular plate with a top surface, said circular plate mounted below a central bore of an inlet pipe providing an inlet for the tank, the top surface of the plate being greater than the cross-sectional area of the bore, the gap between the top surface of the outer perimeter of the plate and the bottom surface of the inlet pipe adjacent to and surrounding the bore being sufficiently small as to trap liquid therebetween.

6. A hot liquid storing and dispensing unit comprising:
    a closed hot water tank having a wall;
    a housing containing the hot water tank;
    an insulating jacket within the housing and surrounding the hot water tank;
    an outlet dispensing tap;

conduit means passing through the insulating jacket and connecting the outlet dispensing tap to the hot water tank wall, said conduit means communicating an outlet orifice in said tap with an orifice in said tank wall;

orifice closure means in said conduit means;

means outside the housing for actuating the dispensing tap;

elongate connecting means extending from said orifice closure means to said actuating means;

a dispensing valve within the jacket coupled to the actuating means adjacent to the tank wall;

a hot liquid inlet conduit connected to a water supply and having a passage extending through the tank wall and opening vertically downwards into the hot water tank above a supply of water in the hot water tank; and a steam trap, terminating said hot liquid inlet conduit, said steam trap located in a vapor space in said hot water tank and including means for normally closing the inlet passage to prevent escape of steam from the hot water tank through the inlet passage and for opening the inlet passage in response to a predetermined head of water in the inlet passage to allow water from said supply to enter the tank, wherein the tank has an insulated wall structure and the insulated wall structure comprises said first claimed wall which has a surface thereon, an outer wall with a surface and said jacket between said first claimed and outer wall surfaces.

7. A hot liquid storing and dispensing unit as claimed in claim 6 wherein said jacket is made form an insulating foam material.

8. A hot liquid storing and dispensing unit as claimed in claim 6 wherein cooling rate within the unit is less than 5° C., per hour.

9. A hot liquid storing and dispensing unit as claimed in claim 7 wherein the dispensing valve comprises a silicon rubber valve element which is spring biassed against a valve seat mounted within the insulated wall structure, said valve seat forming part of the dispensing tap.

10. A hot liquid storing and dispensing unit as claimed in claim 5 wherein the dispensing tap has an outlet, the outlet of the dispensing tap is positioned a sufficient distance from the housing to allow easy access for dispensing.

11. A hot liquid and dispensing unit as claimed in claims 9 or 10 wherein the housing is made of plastics material to minimise heat losses within the unit.

12. A hot liquid and dispensing unit as claimed in claim 6 wherein a unitary assembly consisting of said hot water tank, insulating jacket, dispensing tap, connecting means, actuating means and dispensing valve and means are provided for readily detaching the unitary assembly as a unit from said housing to permit dispensing of beverage at a location remote from said housing.

13. An apparatus for heating and dispensing a plurality of liquids as claimed in claim 12 wherein there are a plurality of unitary assemblies such as the first claimed unitary assembly on said housing and each said unitary assembly has associated therewith means for connecting directly to a public water supply.

* * * * *